United States Patent [19]

Keely et al.

[11] 4,077,738
[45] Mar. 7, 1978

[54] TIME MODULATED POSITION CONTROLLER

[75] Inventors: W. A. Keely, Highland; R. Korneffel, Rochester, both of Mich.

[73] Assignee: Teledyne Industries, Inc., Los Angeles, Calif.

[21] Appl. No.: 644,572

[22] Filed: Dec. 29, 1975

[51] Int. Cl.² .............................................. F15B 13/16
[52] U.S. Cl. ........................................ 415/36; 91/361
[58] Field of Search ................... 415/36; 91/361, 362, 91/363 A, 363 R; 417/47; 318/599

[56] References Cited

U.S. PATENT DOCUMENTS

| | | | |
|---|---|---|---|
| 3,266,378 | 8/1966 | Shaw | 91/363 R |
| 3,390,614 | 7/1968 | Tatum | 91/363 R |
| 3,521,535 | 7/1970 | Oelrich | 91/361 |
| 3,612,975 | 10/1971 | Keefe | 318/599 |
| 3,618,469 | 11/1971 | Wills et al. | 91/361 |
| 3,698,829 | 10/1972 | Kubo et al. | 415/36 |
| 3,798,525 | 3/1974 | Cooper | 91/361 |

*Primary Examiner*—Paul E. Maslousky

*Attorney, Agent, or Firm*—Gifford, Chandler, Sheridan & Sprinkle

[57] ABSTRACT

A time modulated position controller is provided comprising a hydraulic actuator having a cylinder and a piston slidably disposed in the cylinder thus defining a chamber within the cylinder. An electric solenoid valve functions upon actuation to permit fluid communication from a source of fluid pressure to the cylinder chamber while, conversely, upon deactuation of the solenoid valve, the valve functions to exhaust fluid from the cylinder chamber. A position transducer, which generates a signal in response to the axial position of the piston within the cylinder, is coupled to one input of a differential amplifier while a control line, having an analog signal is coupled to the second input of the differential amplifier. The error output from the differential amplifier is time modulated to produce a square wave with a variable duty cycle which in turn is used to activate the solenoid valve. Variation of the duty cycle to the solenoid valve causes the piston to accordingly assume a different axial position within the cylinder.

4 Claims, 4 Drawing Figures

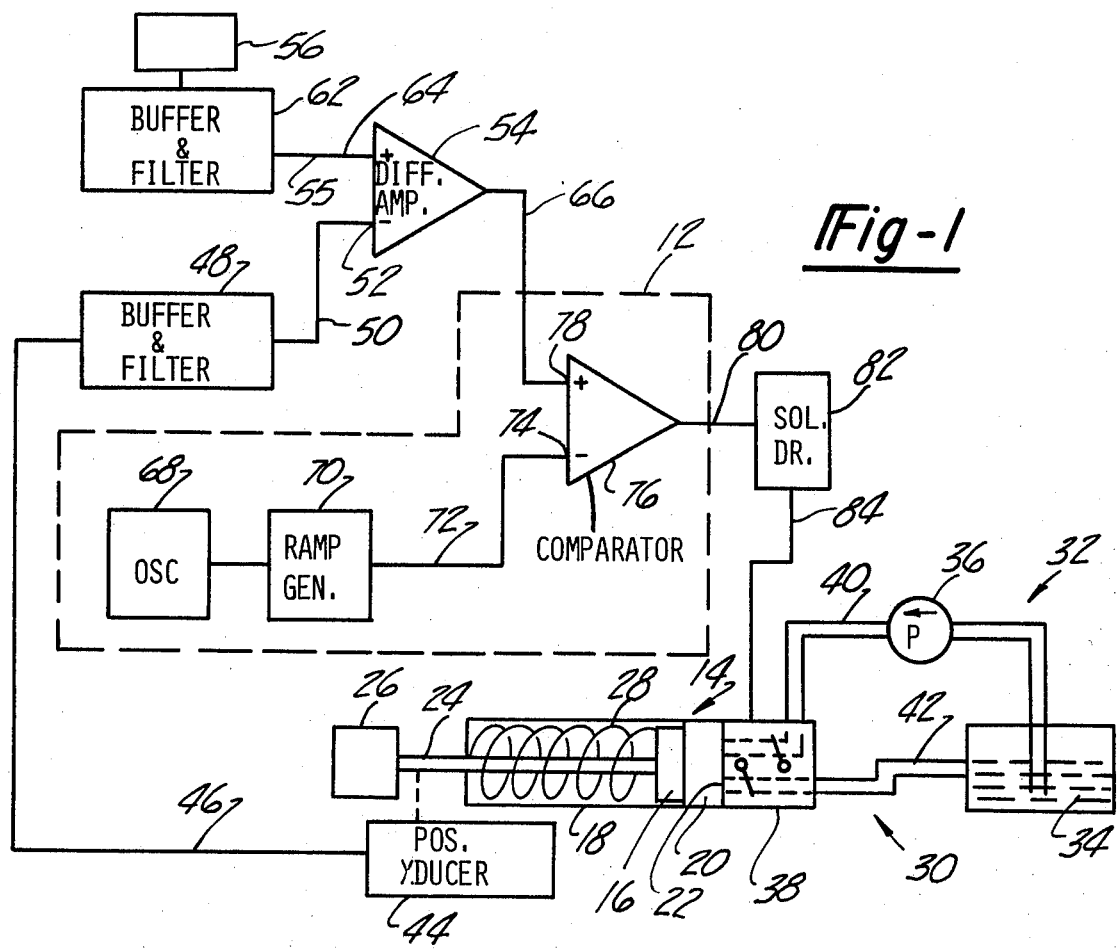
*Fig-1*
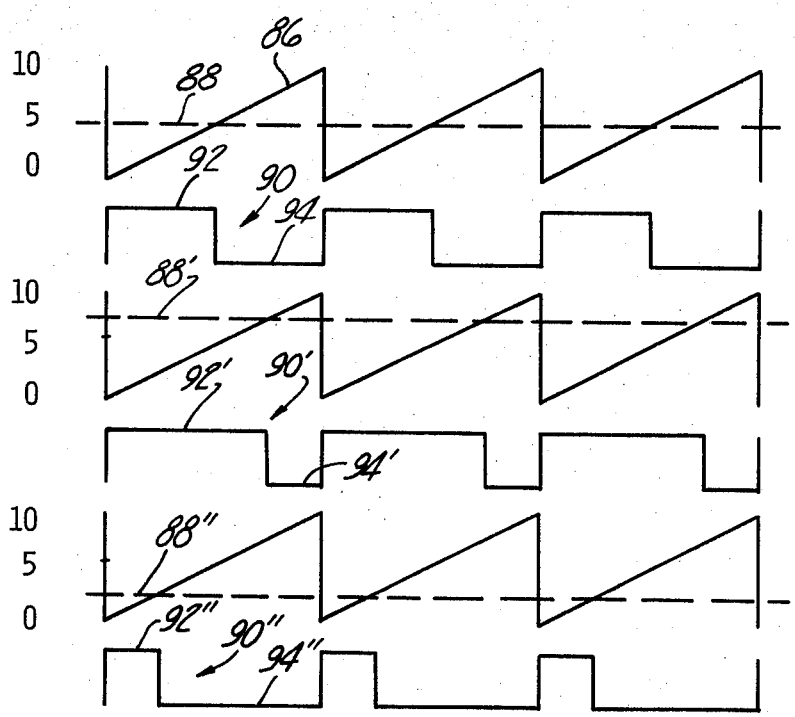
*Fig-2*
*Fig-3*
*Fig-4*

TIME MODULATED POSITION CONTROLLER

BACKGROUND OF THE INVENTION

I. Field of the Invention

The present invention relates generally to position controllers and more particularly to a time modulated position controller particularly adapted for use with variable area turbochargers.

II. Description of the Prior Art

Position controllers adapted to mechanically position an actuator with respect to an analog signal have gained wide use and acceptance throughout industry in many different applications. For example, in one particular application, a position controller is utilized to control blade pitch in a variable area turbocharger. For maximum turbocharger power and efficiency the pitch of the turbine blades must be varied as a function of the rotational speed of the engine.

Heretofore position controllers for changing the blade pitch in variable area turbochargers have proven to be not only expensive to construct, but also inadequate in operation. One major disadvantage of the previously known position controllers is that operating conditions other than the engine rotational speed, such as aerodynamic loading, affected the position of the position controller. Since for maximum efficiency it is most desirable to have the position controller only responsive to the rotational speed of the engine, these previously known position controllers have resulted in lower engine power and efficiency and resultant fuel waste.

SUMMARY OF THE PRESENT INVENTION

The present invention overcomes the above mentioned disadvantages of the previously known position controllers by providing a time modulated position controller particularly suited for controlling the blade pitch in a variable area turbocharger. The controller of the present invention generally comprises a hydraulic actuator having a cylinder and a piston slidably disposed within the cylinder thus defining a chamber within the cylinder. A solenoid valve fluidly communicates with both a source of fluid pressure and the cylinder chamber and functions upon actuation to permit fluid communication from the source of fluid pressure and into the cylinder chamber thereby extending the piston. Conversely, upon deactuation of the solenoid valve, the valve functions to exhaust fluid from the cylinder chamber thereby retracting the piston. Although the piston controller of the present invention may be adapted to position any mechanical actuator in response to an analog signal, in the preferred form of the invention linkage means are coupled between the piston and the blade pitch actuator of the variable area turbocharger so that the blade pitch varies in accordance with the axial position of the piston in the cylinder.

In order to control the actuation of the solenoid valve, and consequently extension or retraction of the piston, a position transducer, which generates a signal responsive to the axial position of the piston, is connected to one input of a differential amplifier. A control line, having an analog signal such as a voltage proportional to the rotational speed of the turbocharger, is coupled to the second input of the differential amplifier. The error output from the differential amplifier is then time modulated to produce a square wave having a variable duty cycle which is varied in accordance with the error output from the differential amplifier. The output from the modulator drives the solenoid valve to alternatively permit fluid communication from the fluid source to the cylinder chamber upon actuation and upon deactuation to exhaust fluid from the cylinder chamber. By varying the ratio of solenoid actuation time to the solenoid deactuation time, the total volume of the chamber, and hence the axial position of the piston within the chamber, is varied.

The real time modulator of the present invention comprises an oscillator driving a ramp generator to produce a ramp signal at a fixed frequency. The fixed frequency ramp signal is coupled to one input of a comparator while the second input of the comparator is connected to the error output from the differential amplifier. As previously noted, the comparator produces a square wave having a duty cycle which is variable in accordance with the output of the differential amplifier. The comparator drives a solenoid driver which actuates the solenoid valve.

DESCRIPTION OF THE DRAWING

The position controller of the present invention will be more clearly understood by reference to the following detailed description when read in conjunction with the accompanying drawing, wherein like reference characters refer to like parts throughout the several views, and in which:

FIG. 1 is a block diagrammatic view of the time modulated position controller of the present invention;

FIG. 2 is a waveform diagram of the time modulated position controller of the present invention showing the position controller in a steady state condition;

FIG. 3 is a waveform diagram similar to FIG. 2 but showing the position controller of the present invention in a transient condition to extend the actuator; and FIG. 4 is a waveform diagram similar to FIGS. 2 and 3 but showing a transient condition to retract the actuator.

DETAILED DESCRIPTION OF THE INVENTION

Referring primarily to FIG. 1 the time modulated position controller of the present invention generally comprises a real time modulator 12 which operatively controls hydraulic actuator 14 in a manner which will become hereinafter apparent. The hydraulic actuator 14 includes a piston 16 slidably received in a cylinder 18 thus defining a chamber 20 bounded by the piston 16, the cylinder 18, and the end 22 of the cylinder 18. A piston rod 24 forms the linkage means between the piston 16 and a mechanical device 26 responsive to the axial position of the rod 24, such as a blade pitch actuator in a variable area turbocharger.

Resilient means, such as a helical spring 28, urge the piston 16 toward a retracted position in the cylinder 18 while a hydraulic system 30 is operable to vary the volume of the chamber 20 in the following manner. A source 32 of fluid pressure, such as a tank 34 and a pump 36, fluidly communicates with a solenoid valve 38 through a conduit 40. The solenoid valve 38 serves a two-fold function. First, upon actuation, the valve 38 opens and permits fluid communication from the source 32 of fluid pressure, through conduit 40 and into the cylinder chamber 20 thereby increasing the fluid volume of the cylinder chamber 20 and causing the piston 16 to extend in the cylinder 18. Secondly, upon deactuation, the valve 38 blocks the fluid flow from the source 32 to the cylinder chamber 20 and thereinstead permits fluid in the cylinder chamber 20 to exhaust from the chamber 20 through an exhaust conduit 42 and back to the tank 32 thereby reducing the fluid volume of the cylinder chamber 20 and causing the piston 16 to retract in the cylinder 18. The resilient means 28 provides the force required to exhaust fluid from the chamber 20, and in the preferred form of the invention, the rate of fluid flow into the chamber 20 upon actuation of the valve 38 equals the rate of fluid exhaustion from the chamber 20 upon deactuation of the valve 38.

In order to control the actuation and deactuation of the solenoid 38, a position transducer 44 which generates an electric signal proportional to the axial position of the piston 16 within the cylinder 18, is connected through a line 46, a buffer and filter 48 and a line 50 to the negative input 52 of a differential amplifier 54. A control line 55 is connected to the positive input 64 of the differential amplifier and as will later be more clearly understood, the voltage on the control line 55 controls the axial position of the piston 16 within the cylinder 18. In the preferred form of the invention, the control line 55 is connected through a buffer and filter 62 to a second transducer 56 which produces an output voltage proportional to the rotational speed of the turbine engine. The error output voltage from the differential amplifier 54, which represents a voltage proportional to the voltage difference between the lines 50 and 55, is fed along line 66 to the real time modulator 12.

The real time modulator 12 comprises a fixed frequency oscillator 68 which drives a ramp generator 70 to produce a fixed frequency ramp signal on the line 72. The line 72 in turn is connected to the negative input 74 of a comparator 76 while the differential amplifier error output line 66 is connected to the positive input 78 of the comparator 76. The comparator 76 is conventional A/D comparator which produces a high voltage level at its output 80 whenever the voltage at the positive input 78 exceeds the voltage at the negative input 74. Conversely, when the voltage at the negative input 74 exceeds the voltage at the positive input 78, the comparator output 80 assumes a low voltage level. The comparator output 80 is coupled to a solenoid driver 82 which actuates the solenoid valve 38 along a line 84 whenever a high voltage level is present on the comparator output 80 while conversely the solenoid driver 82 deactuates the solenoid valve 38 whenever the comparator output 80 assumes a low voltage level.

The operation of the present invention will now be described. Referring first to FIGS. 1 and 2, waveform 86 represents the fixed frequency ramp signal at the negative input 74 of the comparator 76. For illustration purposes only, the waveform 86 oscillates between 0 and 10 volts. FIG. 2 represents a steady state condition for the position controller of the present invention, i.e. the voltage levels of inputs 52 and 64 of the differential amplifier 54 equal each other, so that the error output 66 from the differential amplifier 54 equals five volts as shown by waveform 88. Waveforms 86 and 88 represent the voltage inputs to the comparator 76 so that a square wave 90 is produced at the comparator output 80. With the waveform 90 at a high voltage level, shown at 92, the solenoid driver 82 actuates the solenoid valve 38 to permit fluid communication between the conduit 40 and the chamber 20 thus causing the piston 16 to extend in the cylinder 18. Conversely, with the waveform 90 at a low voltage level, indicated at 94, the solenoid driver 82 deactuates the solenoid valve 38 and permits fluid in the chamber 20 to exhaust through the exhaust conduit 42 and return to the tank 34. With the position controller in the steady state condition illustrated in FIG. 2, a 50/50 duty cycle is provided to the solenoid valve 38 and since the rate of fluid flow into the chamber 20 equals the rate of fluid exhaustion the piston 16 dithers around a fixed position.

Referring now to FIGS. 1 and 3, when the voltage level at the input 64 of the differential amplifier 54 exceeds the voltage level at the differential amplifier input 52, the voltage level 88' at the differential amplifier error output 66 is greater than illustrated in FIG. 2. In this condition, the comparator 76 generates an output waveform 90' having a high voltage level 92' proportionately longer than a low voltage level 94'. Thus the duty cycle to the solenoid driver 82, and consequently, the solenoid valve 38 is varied so that the solenoid valve 38 is actuated proportionately longer than it is deactuated. In this condition, the fluid from the conduit 40 extends the piston 16 within the cylinder 18 by increasing the net volume of the chamber 20. When the piston 16 reaches its proper extended position, the voltage from the position transducer 44 increases the voltage at the differential amplifier input 52 until the steady state condition illustrated in FIG. 2 and described above is achieved.

Referring to FIGS. 1 and 4, with the differential input 64 at a lower voltage level than the input 52, the voltage waveform 88" is at a lower voltage level than the waveform 88 illustrated in FIG. 2. In this condition, the comparator output waveform 90" assumes a high voltage level 92" for a proportionately shorter time period than a low voltage level 94". As should be apparent, the solenoid valve 38 is accordingly actuated a relatively short time in comparison to its deactuation time so that the valve 38 exhausts more fluid from the chamber 20 through the conduit 42 then the chamber 20 receives from the conduit 44 so that the volume of the chamber 20 is reduced thereby retracting the piston 16 into the cylinder 18.

It can thus be seen that the time modulated position controller of the present invention provides a simple and relatively inexpensive position controller which is responsive only to the voltage level on its control line. It should also be apparent that the time period for the real time modulator can be adjusted to any desired frequency by merely changing the frequency of the oscillator 68. Also, although the position controller of the present invention has been described in conjunction with a blade pitch actuator in a variable area turbocharger, it must be understood that the position controller of the present invention may be utilized with any mechanical system without deviating from the spirit of the invention.

Having thus described our invention, many modifications may be made thereto by those skilled in the art to which it pertains without deviating from the spirit of the invention as defined by the scope of the claims.

We claim:

1. A time modulated position controller comprising:
    a hydraulic actuator having a cylinder and a piston slidably disposed in said cylinder, said piston defining a chamber within said cylinder,
    resilient means for urging said piston in one axial direction,
    a source of fluid pressure and valve means operable upon actuation to permit fluid communication from said source of fluid pressure to said cylinder chamber, said valve means also operable upon deactuation to exhaust fluid from said cylinder chamber, and means for actuating said valve means comprising a transducer operable to generate a signal at its output proportional to the axial position of said piston within said cylinder, a control line connected to a control signal input, said control line and said transducer output being connected to inputs of a differential amplifier which produces an error output signal, and time modulator means for modulating the error output of said differential amplifier to produce an output signal to actuate said valve wherein said time modulator means comprises a fixed frequency oscillator having its output coupled to a ramp generator to generate a ramp output signal at a fixed frequency, a digital comparator which produces an output signal at one voltage level when the ramp output signal exceeds error output signal and which produces an output signal at another voltage level when the error output signal exceeds the ramp output signal, said comparator having one input connected to the error output signal from said differential amplifier and its other input connected to the ramp output signal from said ramp generator and a valve driver having an input coupled to the output from said comparator and an output coupled to said valve means whereby said valve driver actuates said valve means upon receipt of the comparator output signal at one voltage level and deactuates said valve means upon receipt of the comparator output signal at the other voltage level.

2. The invention as defined in claim 1, wherein said valve means is a solenoid powered valve, and wherein said valve driver is a solenoid driver.

3. The invention as defined in claim 1, and including linkage means coupled between said piston and a blade pitch actuator in a variable area turbocharger to produce blade pitch variation in accordance with the axial position of said piston in said cylinder.

4. The invention as defined in claim 3, wherein the signal of the control line is proportional to the rotational speed of said turbocharger.

* * * * *